FUEL INDUCTION DEVICE

Original Filed Oct. 11, 1965 2 Sheets-Sheet 1

INVENTOR
Alan M. Binder
by McDougall, Hersh & Scott
Attys

FUEL INDUCTION DEVICE

Original Filed Oct. 11, 1965 2 Sheets-Sheet 2

INVENTOR
Alan M. Binder
by McDougall, Hersh & Scott
Attys

United States Patent Office

Re. 27,087
Reissued Mar. 23, 1971

27,087

FUEL INDUCTION DEVICE

Alan M. Binder, 13 Emerson Gardens,
Lexington, Mass. 02173

Original No. 3,389,894, dated June 25, 1968, Ser. No. 494,726, Oct. 11, 1965. Application for reissue May 28, 1969, Ser. No. 845,105
Int. Cl. F02m *69/04*
U.S. Cl. 261—36 22 Claims

Matter enclosed in heavy brackets [ ] appears in the original patent but forms no part of this reissue specification; matter printed in italics indicates the additions made by reissue.

ABSTRACT OF THE DISCLOSURE

An induction device including a fluid amplifier adapted to proportion liquid flow between separate outlet passages in response to the flow of a controlling fluid through said amplifier.

This invention relates to an induction device adapted to be employed in combination wtih various constructions. Devices of the type contemplated are employed, for example, for injecting a fuel-air mixture into a combustion location in combustion engines. The invention will be described with reference to an application of this nature; however, it will be understood that other applications are contemplated.

Conventional carburetors are almost universally employed in internal combustion engines. Such devices operate to achieve an air-gas mixture of a proper ratio whereby combustion will take place in a desired manner.

Currently available carburetors are characterized by certain deficiencies. The carburetors are relatively complex, relatively large and heavy, and they are relatively expensive from the standpoint of initial cost as well as maintenance. The fact that carburetors have a plurality of moving parts increases the likelihood of improper or inefficient operation. It is well recognized that the inability to provide carburetors which operate at high efficiency on a consistent basis is a major difficulty in achieving the best possible engine performance.

It is an object of this invention to provide an induction device which is adapted to be used, for example, in place of a carburetor in an internal combustion engine.

It is a further object of this invention to provide a fuel induction device which overcomes the deficiencies of standard carburetors from the standpoint of operating efficiency and from the standpoint of initial cost as well as operating cost.

Figure 1:
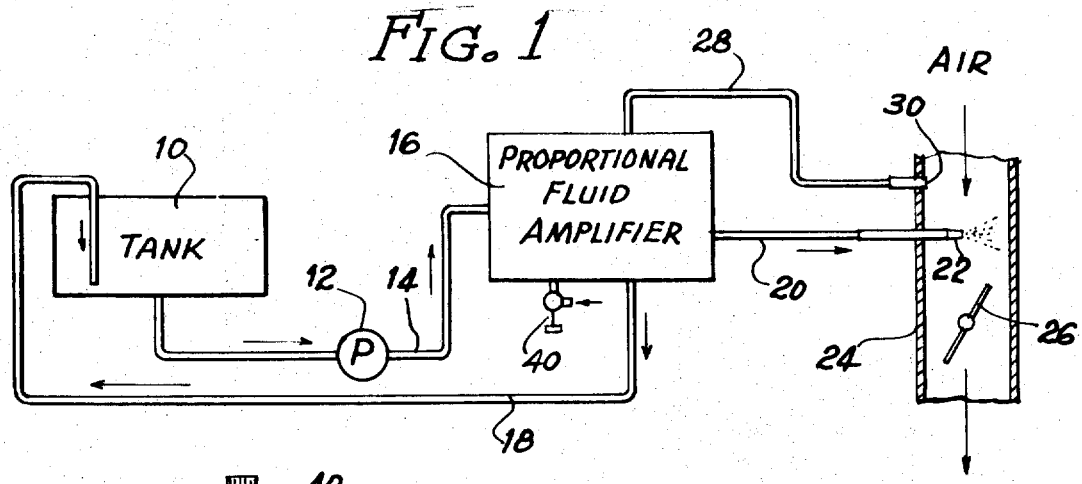
Figure 2:
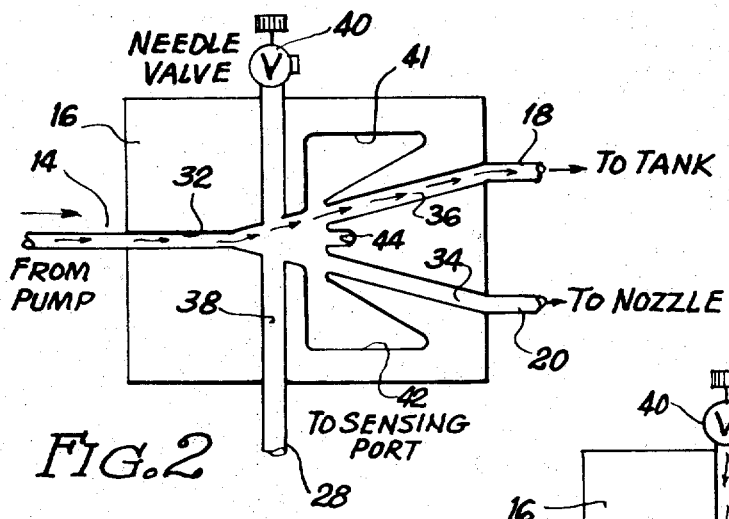
Figure 3:
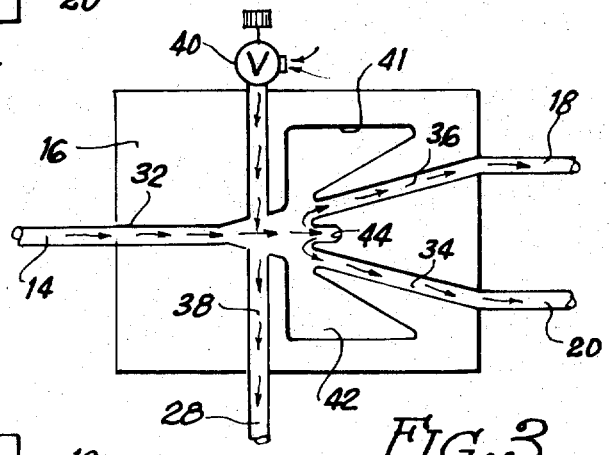
Figure 4:
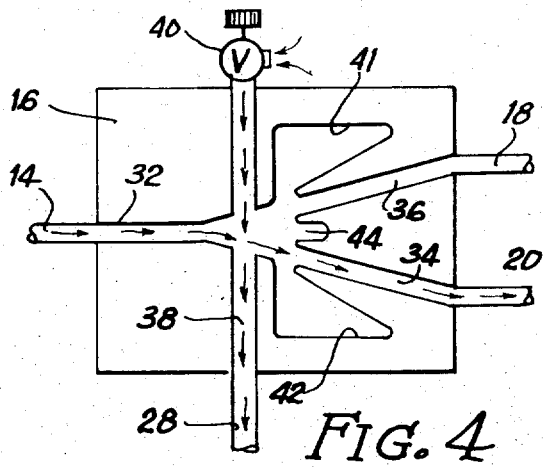
Figure 5:
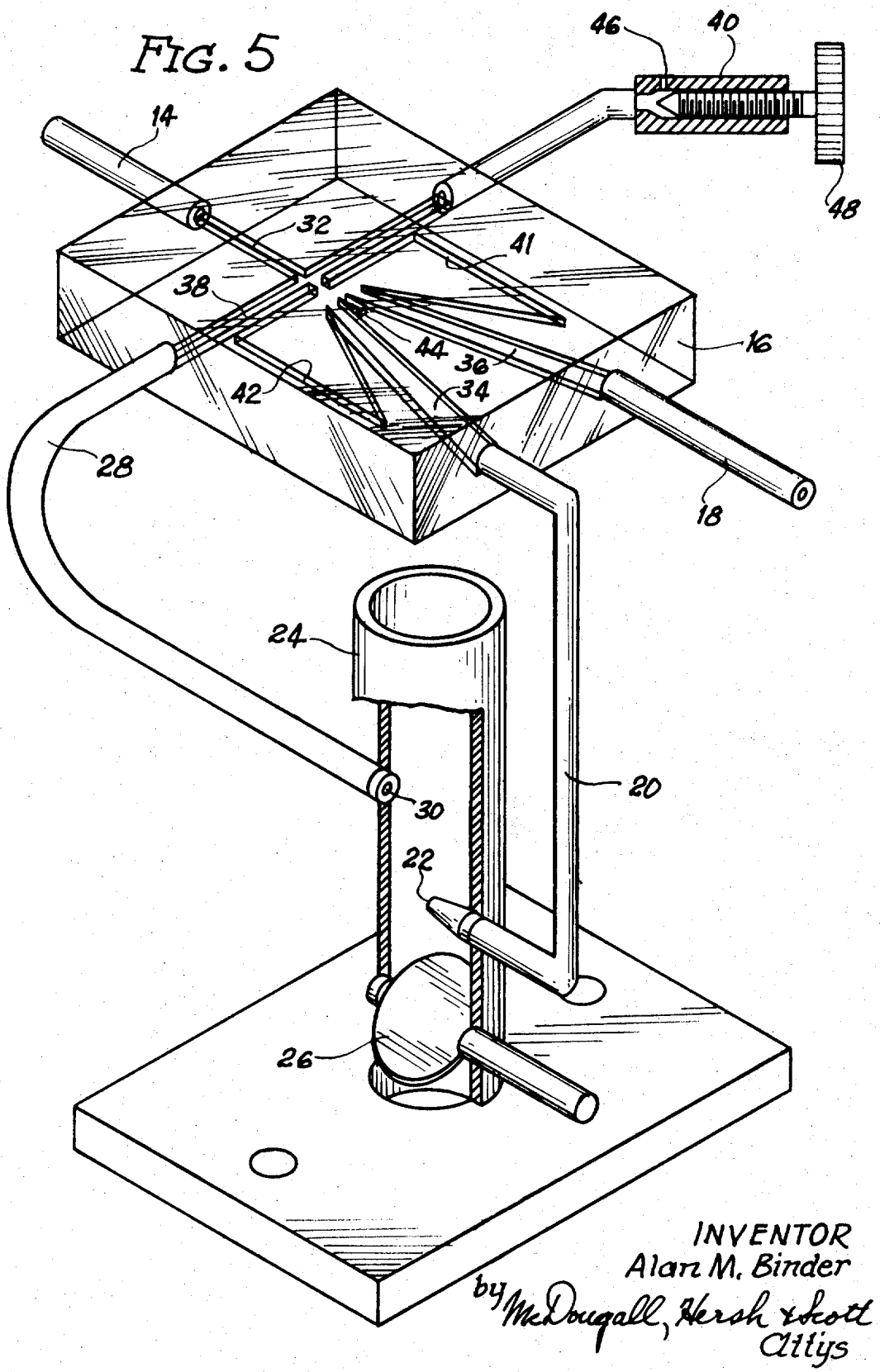

These and other objects of this invention will appear hereinafter, and for purposes of illustration but not of limitation, specific embodiments of this invention are shown in the accompanying drawings in which:

FIG. 1 is a diagrammatic illustration of the application of this invention to an internal combustion engine;

FIGS. 2, 3 and 4 comprise diagrammatic illustrations of various operating stages of a proportional fluid amplifier employed in the device of this invention; and, FIG. 5 comprises a perspective view illustrating the fuel induction device of this invention in association with an engine manifold.

The fuel induction device of this invention will be described with reference to engines of the type employed in automobiles. It will be obvious that the unit of this invention is uniquely suitable for such purposes. It will be apparent, however, that many other applications for the device are possible.

The fuel induction device is characterized by a fluid amplifier through which fuel passes prior to combustion.

A plurality of passages are defined in the amplifier with the first of the passages being connected to a fuel supply.

Second and third passages communicate with the first passage. The second passage is connected to a combustion location whereby fuel passing through the second passage will be delivered for combustion. The third passage by-passes the second passage thereby providing a means for dividing the fuel issuing from the first passage.

Means are provided for controlling the relative amount of fuel passing into the second and third passages. These means include the use of a separate fluid which contacts the fuel to thereby divert the path of movement of the fuel. Depending upon the intensity of the diverting action, the relative amounts of fuel can be regulated.

In the preferred form of the invention, an air stream is employed for contacting the stream of fuel whereby the action of the air stream can divert the fuel flow. In an automobile, the air stream can be readily formed by setting up a venturi action. As will be explained, this arrangement provides an ideal means for regulating fuel flow in conjunction with engine speed.

The accompanying drawings illustrate the use and construction of the fuel induction device of this invention. FIG. 1 illustrates a fuel tank 10 and a fuel pump 12. The pump 12 is adapted to move fuel through line 14 to the proportional fluid amplifier 16. A return or by-pass line 18 operates to return fuel which is not used for engine operation to the tank 10.

Line 20 connects the amplifier 16 with a nozzle 22. This nozzle operates to deliver fuel to the conduit 24. An air stream passing through the conduit provides for mixture of the fuel with air, and it will be appreciated that this conduit can be directly connected to or comprise a part of an engine manifold.

The air flow in the conduit 24 is regulated by a butterfly valve 26. This valve may be connected to the accelerator of an automobile whereby the air flow can be controlled in accordance with the desired speed of the automobile. As will become apparent, the air speed in the conduit 25 controls the operation of the fluid amplifier so that this desired arrangement can be accomplished.

An additional line 28 connects the conduit 24 with the amplifier 16. The open end 30 of the line 28 communicates with the conduit 24, and a venturi effect occurs at this point.

The structure of the amplifier 16 is shown in FIGS. 2, 3 and 4 while FIG. 5 illustrates this structure as it would appear in conjunction with a typical engine system. The first passage 32 communicates with the line 14 whereby fuel will flow in the passage 32. This passage interconnects with second and third passages 34 and 36, respectively. A fourth passage 38 intersects the passage 32 at its exit end.

A needle valve 40 is associated at one end of the passage 38, and this valve is open to ambient air. The passage 38 connects with the line 28 whereby suction will draw air through the valve 40 into the line 38.

The parts of the construction are disposed whereby fuel will normally tend to pass from the passage 32 into the passage 36. The passage 36 is connected to the line 18 whereby the fuel is circulated back to the tank 10. This situation will occur when there is no suction created in the line 28 as when the butterfly valve 26 closes off conduit 24.

When suction is created, a stream of air will pass through the passage 38 whereby fuel will be diverted at least in part to the passage 34. The condition shown in FIG. 3 is intended to illustrate some intermediate condition wherein part of the fuel circulates back to the tank 10 while part of the fuel passes through passage 34 to line 20 and then out the nozzle 22. FIG. 4 illustrates a more extreme position wherein the suction created in the line 28 operates to deliver virtually all of the fuel through the line 20 into the conduit 24.

It will be noted that the interior of the amplifier 16 includes cavities 41 and 42, these cavities functioning to provide equilibrium within the amplifier whereby relatively gradual transition will occur when the suction in the line 28 changes. The depression 44 formed directly opposite the end of the line 32 also provides a design which enables proper distribution of the fuel.

The embodiment of the invention shown in FIGURE 5 illustrates the use of a plastic block for the amplifier 16. The various passages are formed in the block by means of molding techniques or by machining operations. The various conduits forming the lines which carry the fuel and air streams comprise standard tubing or the like.

The needle valve 40 shown in this figure defines an opening 46. Turning of the handle 48 will operate to enlarge or restrict the passage between the opening 46 and the passage 38 in the amplifier. Accordingly, the needle valve can be adjusted to thereby adjust the operation of the amplifier under specific conditions.

It has been found that the provision of the cavities 41, 42 and 44 contributes in a significant degree to the proper functioning of the construction. The exact reasons for the advantageous results achieved when these cavities are employed are not completely understood. The presence of the cavities 41 and 42, which are relatively large in volume when compared with the cross section of the passages 18 and 20, clearly provides distinct improvements in the engine operation. Similarly, the intermediate depression 44 provides for fuel flow which cannot be achieved in the absence of this depression.

It has been found, for example, that a similar construction without the cavities would not function properly when two different types of fluid are employed. Thus, where air is employed for diverting liquid fuel, the presence of the cavities is extremely important. They are, on the other hand, not critical when like fluids, such as water and water, are utilized as the separate fluids. It will, therefore, be appreciated that the instant invention is particularly concerned with applications which involve liquid flow which is diverted by means of a gas such as air.

The construction of this invention is characterized by several advantageous features when compared with a carburetor arrangement. The amplifier 16 is essentially a one-piece unit with no moving parts. The arrangement can be readily attached to existing intake manifolds or standard engines and the system can utilize standard fuel pumps and other standard automobile elements.

The amplifier 16 can be molded or otherwise formed from plastic materials or from metal and can be formed in one piece or from separate pieces. The manufacture of the amplifier is much simpler than in the case of a carburetor. In addition, the conduit 24 and the fittings and tubing might also be made from plastic. A manufactured form of the device could have the entire unit, except for the needle and butterfly valves, constructed from one piece of molded plastic or metal.

It has also been found that the arrangement of this invention will provide highly suitable performance from the standpoint of engine reaction and economy. The system is characterized by excellent constant speed control characteristics.

It will be appreciated that the sizes of the various parts of the device will vary depending upon the application involved. For example, a high horsepower engine will require a larger unit than a smaller engine. Relative dimensions of the various elements can also be varied for a particular application to provide an optimum ratio and control.

In some instances, more than one nozzle can be utilized, depending on the type of operation contemplated. Similarly, an entire fluid amplifier unit may be duplicated in a single construction. Thus, some applications may desirably employ a fluid amplifier in association with a conduit 24 for each engine cylinder.

As previously indicated, the concepts of this invention are not limited in the applicability to internal combustion engines. Thus, the fluid amplifier can readily be adapted for use in conjunction with gas turbine engines. The invention need not, in fact, be directly applied to engines since the fluid amplifier could, for example, be used in systems which provide for injecting of water into an air conditioning system to control humidity.

It will be understood that various changes and modifications can be made in the above described system which provide the characteristics of this invention without departing from the spirit thereof particularly as defined in the following claims.

That which is claimed is:

1. In an internal combustion engine construction, the improvement in a fuel induction device comprising a fluid amplifier through which fuel passes prior to combustion, said amplifier defining a plurality of interconnected passages, the first of said passages having an inlet end connected to a supply of fuel, a second passage communicating with the outlet end of said first passage, said passage leading to a combustion location for delivering fuel to said location, and separate third and fourth passages each defining an opening communicating with said outlet end of said first passage, means for directing a separate fluid out of said fourth passage into contact with the fuel passing through said amplifier at a point adjacent said outlet end, said separate fluid being adapted to divert said fuel upon contact therewith whereby the relative amounts of fuel passing through the respective second and third passages can be regulated depending on the intensity of the contact of said separate fluid with said fuel, and means communicating the outlet of said fourth passage with a suction source responsive to engine operating conditions, said suction source operating to draw said separate fluid through said fourth passage for achieving the contact with said fuel.

2. A construction in accordance with claim 1 wherein said first, second and third passages have a common intersection with the fuel in the first passage being adapted to branch into the second and third passages, and wherein said fourth passage passes through said intersection whereby said separate fluid is adapted to engage said fuel as it passes out of said first passage and prior to its entry into said second and third passages.

3. A construction in accordance with claim 2 wherein said fourth passage extends transversely of said first passage.

4. A construction in accordance with claim 2 including a pair of cavities positioned adjacent the sides of said second and third passages, said cavities communicating, one of said cavities communicating with each of said passages.

5. A construction in accordance with claim 1 wherein said second passage delivers said fuel into contact with an air stream whereby the fuel is mixed with air prior to combustion.

6. A construction in accordance with claim 5 including a conduit leading to said engine and a nozzle for directing fluid into said conduit, said second passage extending to said nozzle whereby fuel is adapted to be delivered into said conduit.

7. A construction in accordance with claim 6 wherein said third passage is connected to said fuel supply whereby fuel which is by-passed will be circulated back to the fuel supply.

8. A construction in accordance with claim 6 wherein said first, second and third passages have a common intersection with the fuel in the first passage being adapted to branch into the second and third passages, and wherein said separate fluid is carried in a fourth passage with said fourth passage through said intersection whereby said separate fluids is adapted to engage said fuel as it passes out of said first passage and prior to its entry into said second and third passages.

9. A construction in accordance with claim 8 wherein said fourth passage extends transversely of said first passage.

10. A construction in accordance with claim 8 wherein said fourth passage extends to an outlet opening defined in the wall of said conduit, means for passing a stream of air through said conduit for mixture of said air with the fuel passing out of said nozzle, the action of said stream of air at the outlet opening of said fourth passage creating a venturi effect whereby suction is created in said fourth passage, and the opposite end of said fourth passage having an inlet opening for receiving ambient air whereby the suction in said fourth passage draws air into the fourth passage, said air acting as said separate fluid.

11. A construction in accordance with claim 10 including a needle valve at the inlet end of said fourth passage to provide for adjustment of the opening at said inlet end.

12. A construction in accordance with claim 10 including a butterfly valve in said conduit located downstream of said outlet opening defined in the wall of the conduit, and means connecting said butterfly valve to the throttle of said engine.

13. An induction device including a fluid amplifier as a component thereof, said amplifier defining a plurality of interconnected passages, the first of said passages having an inlet end connected to a supply of liquid, a second passage communicating with the outlet end of said first passage, a conduit said second passage having its outlet end communicating with said conduit for delivery of said liquid to the conduit, and third and fourth passages each defining an opening communicating with the outlet end of said first passage, means for directing separate fluid out of the opening of said fourth passage into contact with the liquid passing through said amplifier at a point adjacent said outlet end, said separate fluid being adapted to divert said liquid upon contact therewith whereby the relative amounts of liquid passing through the respective second and third passages can be regulated depending upon the intensity of the contact of said separate fluid with said liquid, and including a suction source communicating with the outlet of said fourth passage, and means for controlling the suction exerted in said fourth passage for thereby controlling the intensity of contact of said separate fluid with said liquid.

14. A construction in accordance with claim 13 wherein said separate fluid comprises a gas.

15. A construction in accordance with claim 14 including a nozzle directed into said conduit, said second passage extending to said nozzle for delivering liquid to said conduit.

16. A construction in accordance with claim 15 wherein said first, second and third passages have a common intersection with the liquid in the first passage being adapted to branch into the second and third passages, and wherein said separate fluid is carried in a fourth passage with said fourth passage passing through said intersection whereby said separate fluid is adapted to engage said liquid as it passes out of said first passage and prior to its entry into said second and third passages.

17. A construction in accordance with claim 16 wherein said fourth passage extends to an outlet opening defined in the wall of said conduit, means for passing a stream of air through said conduit for mixture of said air with the liquid passing out of said nozzle, the action of said stream of air at the outlet opening of said fourth passage creating a venturi effect whereby suction is created in said fourth passage, and the opposite end of said fourth passage having an inlet opening for receiving ambient air whereby the suction in said fourth passage draws air into the fourth passage, said air acting as said separate fluid.

18. A construction in accordance with claim 17 including a butterfly valve in said conduit located downstream of said outlet opening defined in the wall of the conduit, and means connecting said butterfly valve to the throttle of an engine.

19. A construction in accordance with claim 18 wherein said first, second and third passages have a common intersection with the fuel in the first passage being adapted to branch into the second and third passages, and wherein said fourth passage passes through said intersection whereby said separate fluid is adapted to engage said fuel as it passes out of said first passage and prior to its entry into said second and third passages.

*20. An internal combustion engine fuel system including an air intake conduit comprising a nozzle adapted to discharge fuel for mixture with air, fluid amplifier means having an interaction region and including an inlet port opening into said interaction region, a source of fuel connected to said inlet port to issue a fuel stream along a predetermined path within said interaction region, said fuel stream having a predetermined energy state, a source of regulating fluid connected to said interaction region, including means providing an opening to said source of regulating fluid and means connecting said opening through said interaction region to said air intake conduit, the characteristics of the regulating fluid providing a fluid signal having an energy state lower than the energy state of the fuel stream within said interaction region, said amplifier means further including first and second outlet means opening from said interaction region for receiving the fuel stream and establishing rates of fuel flow therethrough which vary in accordance with variations in the path of the fluid stream, passage means connecting said first outlet means to said nozzle for directing fuel flow from said first outlet means through said nozzle, passage means connecting said second outlet means to the source of fuel to return fuel to said source, and means to progressively and variably restrict said opening to control the regulating fluid to cause the fuel stream to be normally biased toward said second outlet.*

*21. The fuel system of claim 20 wherein the pressure of the regulating fluid provides the fluid signal.*

*22. The fuel system of claim 21 wherein said source of regulating fluid comprises a source of air at atmospheric pressure.*

References Cited

The following references, cited by the Examiner, are of record in the patented file of this patent or the original patent.

UNITED STATES PATENTS

| | | | |
|---|---|---|---|
| 2,874,944 | 2/1959 | Dolza | 261—36(.1) |
| 3,477,699 | 11/1969 | Drayer | 261—36 |
| 3,039,490 | 6/1952 | Carlson | 137—81.5 |
| 3,072,147 | 1/1963 | Allen et al. | 137—81.5 |
| 3,198,431 | 8/1965 | Gesell. | |
| 3,232,095 | 2/1966 | Symnoski et al. | 137—81.5 |
| 3,248,053 | 4/1966 | Phillips | 137—81.5 |
| 3,255,971 | 6/1966 | Widell | 137—81.5 |
| 3,260,456 | 7/1966 | Boothe | 137—81.5 |
| 3,122,165 | 2/1964 | Horton | 261—F.A. |
| 3,191,611 | 6/1965 | Bauer | 261—F.A. |
| 3,392,739 | 7/1968 | Taplin et al. | 60—39.28X |

FOREIGN PATENTS

| | | |
|---|---|---|
| 1,257,050 | 2/1961 | France. |
| 694,387 | 7/1953 | Great Britain. |
| 289,804 | 3/1953 | Switzerland. |

OTHER REFERENCES

Kompass: "The State of The Art in Fluid Amplifiers," Control Engineering, January 1963, pp. 88–93.

TIM R. MILES, Primary Examiner

U.S. Cl. X.R.

123—119; 137—81.5; 261—64